Patented June 16, 1953

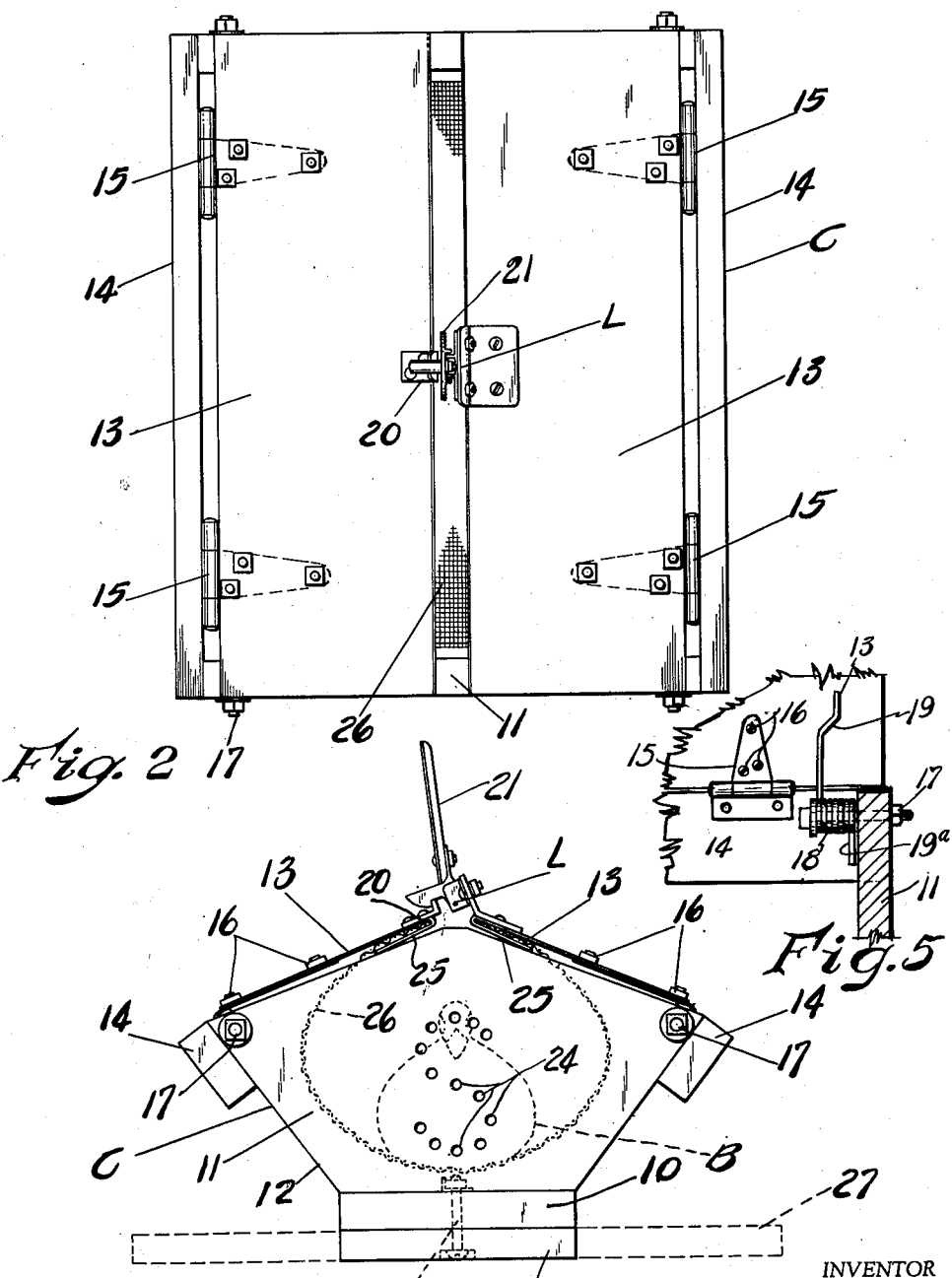

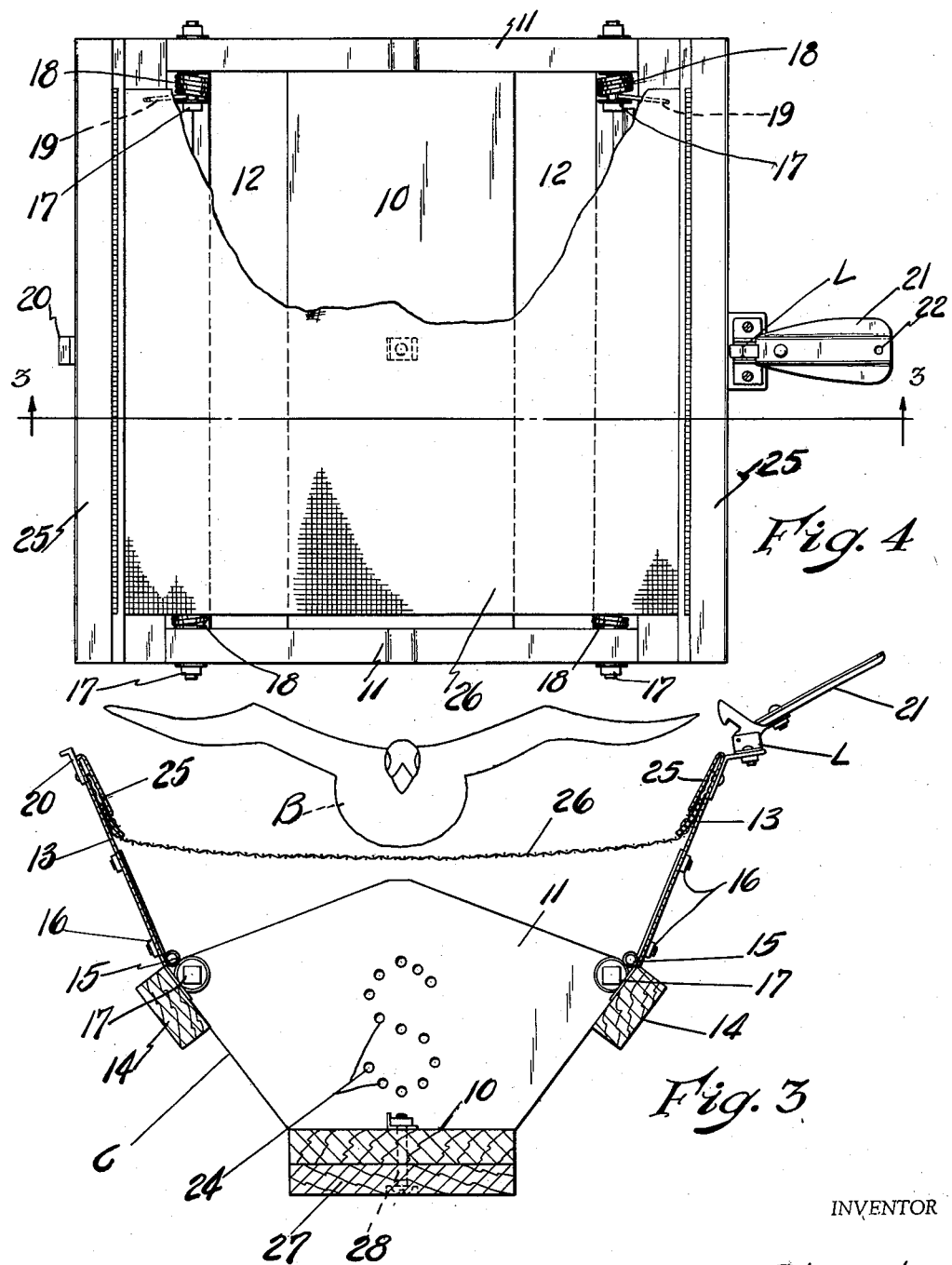

2,642,036

UNITED STATES PATENT OFFICE 2,642,036

BIRD DOG TRAINING DEVICE

John R. Stuart, Farwell, Mich.

Application November 28, 1951, Serial No. 258,693

8 Claims. (Cl. 119—15.6)

This invention relates to releasing traps for training bird dogs, and more particularly to a trap which catapults a captive game or other flight bird into the air when the trap is sprung.

One of the prime objects of my invention is to provide a dog training trap which catapults a bird into the air the instant the trap is tripped, allowing the trainer to control the instant of flushing and removing the danger of the dog catching a slow flushing or non-flushing bird.

Another object of my invention is to design a training device which can be secreted in a field in suitable cover and so camouflaged that it blends into the landscape, so that the dog, unaware of the training trap, points the captive bird, which can then be catapulted or flushed at the proper instant.

A further object is to design a sturdy and compact training device which is light in weight, readily portable, and which can be carried to and placed in any desired location with a minimum of effort.

A further object is to design such a training device in which the tripping action is unaffected by leaves or other camouflage covering the device, the tripping and catapulting action being smooth and rapid.

Another object is to design a trap of the type described which can be effectively used in training all types of bird dogs, and which readily lends itself to use in a wide and varied assortment of training situations throughout the training cycle.

A still further object of my invention is to design a simple and inexpensively manufactured training device which allows the trainer to simulate actual hunting conditions in areas in which game birds are not plentiful.

The instant application is a continuation in part of my co-pending application Serial No. 153,097, filed March 31, 1951, now abandoned.

With the above objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit or sacrificing any of the advantages of the invention.

In the drawings:

Figure 1 is an end elevational view of my dog training trap in "set" position, the broken lines indicating a stabilizing member swung transversely of the trap, and showing also a captive bird in place in the trap.

Figure 2 is a plan view thereof.

Figure 3 is a transverse, sectional view taken on the line 3—3 of Figure 4, showing the panels swung up and the bird (shown in broken lines) being catapulted into the air.

Figure 4 is a plan view thereof, a portion of the catapulting screen being broken away to show the tensioning means for springing the roof panels.

Figure 5 is a fragmentary sectional, side elevational view showing the spring arrangement.

Referring now more particularly to the accompanying drawings in which I have shown the preferred embodiment of my invention, the letter C indicates in general a cage-like trap structure adapted to house a game or other flight bird, and comprises a floor 10, substantially pentagonal end members or walls 11, and inclined, hinged roof panels or doors 13. Longitudinally disposed side bars 14 are secured along the top edges of the side walls 12, and hinges 15 are mounted thereon and are secured to roof panels 13 by means of screws 16.

Spring bolts 17 are anchored in the upper corners of end walls 11 adjacent the hinges 15, and springs 18 are mounted on said bolts 17, the springs 18 having opposed upwardly and downwardly extending free ends 19 and 19ª bearing against the roof panels 13 and side bars 14 respectively, all as clearly shown in Figure 5 of the drawings, so that when the inclined roof panels 13 are swung down to closed position, and releasably held together in a manner to be presently described, they bear against the projecting ends 19 of the springs 18, forcing them downwardly to tension said springs, and it will be apparent that when the two roof panels 13 are released from engagement, they will snap sharply open.

A conventional latch mechanism L is secured to the upper edge of one of the roof panels 13 and releasably engages a strap hook 20 anchored to the opposite panel to hold said panels in locked position. The latch mechanism L includes a handle 21 in which is drilled a passage 22 to accommodate a trip cord (not shown) of any desired length, with the free end leading from the trap so that it may be readily grasped by the trainer.

A limited gap is provided between the upper free edges of the roof panels when they are in closed position, and vent openings 24 are also drilled or punched in the end members 12 to provide air circulation and permit the bird's scent to escape.

The upper free edges of roof panels 13 are turned as at 25 to form screen bindings, and the ends of a flexible screen section or strip 26 are secured in said bindings, said strip 26 forming a loop in which a flight bird is placed when the roof panels 13 are in closed position. This looped screen 26 is quite flexible and is somewhat shorter than the distance between the roof panels 13 when they are in open position, so that when the latch is tripped and the panels spring to open position, the flight bird will be catapulted into the air as illustrated by the broken lines in Figure 3 of the drawings.

A support member or stabilizer 27, preferably cut to the same dimensions as the floor 10 of the trap, is adjustably secured thereto by means of a bolt 28 anchored in the support member 27, and extending through the floor 10. It will be obvious that the stabilizer 27 is held in alignment with the floor 10 when the trap is being transported to its position in the field, and that upon reaching the desired location and setting the trap, the stabilizer 27 may be swung transversely of the floor 10 as clearly shown by the broken lines in Figure 1, and so prevent the trap from tipping over when it is sprung.

In operation, the device and often a number of the devices, are placed in suitable dense spots in the field and are then properly camouflaged. The traps are set by placing a flight bird in the loop formed by the screen strip 26, and setting the latch mechanism L. The dogs are usually brought individually to the general vicinity of the trap in order that they might catch the scent of the bird, and after they have come to point, the trainer or handler springs the trap at the desired instant by pulling the trip cord (not shown). This releases the latch mechanism L and allows the roof panels 13 to spring sharply open, which pulls the screen section 26 taut, catapulting the bird into the air.

It will thus be apparent that I have designed a simple and durable dog training trap which can be easily and inexpensively manufactured, and which lends itself to varied uses in a wide number of training situations.

What I claim is:

1. A dog training device comprising a trap for housing a flight bird, said trap having hinged roof panels in releasable engagement, and a flexible strip of shorter length than the distance between the free edges of the roof panels when said panels are in open position secured at its ends to said roof panels to form a depending flight bird-accommodating loop within the trap when said roof panels are in closed position and to catapult said bird into the air when said roof panels are sharply swung to open position.

2. The combination defined in claim 1 in which a latch is mounted on one roof panel and a hook is secured on the other roof panel to hold said roof panels in releasable engagement.

3. The combination as defined in claim 1 in which springs are provided on said trap and in engagement with said roof panels to normally urge them to open position.

4. The combination as defined in claim 1 in which a stabilizer is adjustably secured to the bottom of said trap to keep said trap from tipping over when the trap is sprung.

5. A dog training device comprising a cage body including a base, end and side walls, said side walls including spring-pressed hinged panels, means for releasably latching the upper ends of said panels together to form a closed cage, a flexible strip of predetermined length connected at its ends only to the free ends of the hinged panels, and a flexible trip cord connected to said releasable latching means for releasing said panels to permit them to swing to open position when the trip cord is actuated.

6. The combination set forth in claim 5 in which a flexible strip forms a loop when the panels are latched together, said strip being snapped taut when the side panels are released and swing to open position.

7. A dog training device comprising a cage body having an open top, a pair of roof panels hingedly mounted on said cage body, spring bolts secured in the upper corners of said body, springs mounted on said bolts, said springs having upwardly projecting free ends adapted to be pressed down to tension said springs when said roof panels are swung to closed position, a latch mechanism for releasably holding said roof panels in closed position, a flexible strip of shorter length than the distance between the roof panels when said roof panels are in open position with its ends secured to the free ends of said roof panels, said strip forming a flight bird accommodating loop when the trap is in closed position, and a trip cord secured to said latch mechanism.

8. The combination defined in claim 7 in which the flexible strip is formed of light, flexible screen.

JOHN R. STUART.

References Cited in the file of this patent

UNITED STATES PATENTS

| Number | Name | Date |
| --- | --- | --- |
| 546,491 | Maierhofer | Sept. 17, 1895 |
| 693,901 | Portman | Feb. 25, 1902 |
| 2,504,763 | Voecks | Apr. 18, 1950 |

FOREIGN PATENTS

| Number | Country | Date |
| --- | --- | --- |
| 2,803 | Great Britain | 1893 |